(No Model.)

T. URIE.
PITMAN COUPLING FOR HARVESTERS.

No. 269,140. Patented Dec. 12, 1882.

WITNESSES:
Fred. G. Dieterich
J. G. Hinkel

Thomas Urie,
INVENTOR,
by Louis Bagger & Co.
ATTORNEYS

UNITED STATES PATENT OFFICE.

THOMAS URIE, OF BOULDER, COLORADO, ASSIGNOR OF ONE-THIRD TO FREDERICK S. HALL, OF SAME PLACE.

PITMAN-COUPLING FOR HARVESTERS.

SPECIFICATION forming part of Letters Patent No. 269,140, dated December 12, 1882.

Application filed October 9, 1882. (No model.)

*To all whom it may concern:*

Be it known that I, THOMAS URIE, of Boulder, in the county of Boulder and State of Colorado, have invented certain new and useful Improvements in Pitmen-Couplings for Harvesting-Machines; and I do hereby declare that the following is a full, clear, and exact description of the invention, which will enable others skilled in the art to which it appertains to make and use the same, reference being had to the accompanying drawings, which form a part of this specification, and in which—

Figure 1:
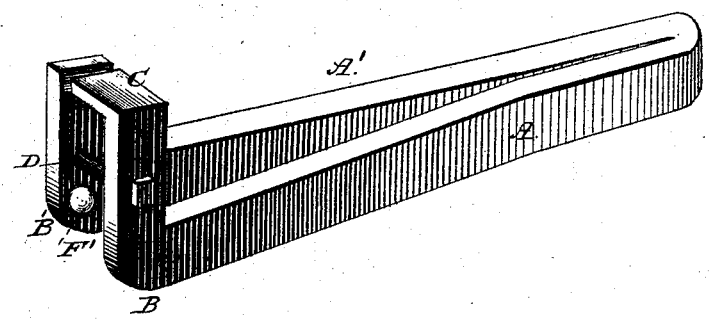
Figure 2:
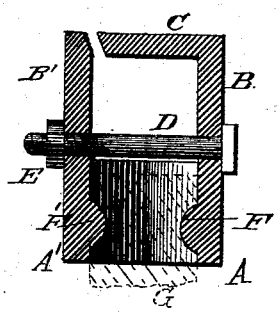

Figure 1 is a perspective view of my improved coupling, and Fig. 2 is a sectional view of the same through the regulating or adjusting bolt.

Similar letters of reference indicate corresponding parts in both the figures.

My invention has relation to devices for coupling the pitman of harvesting-machines to the sickle-bar; and it consists in the detailed construction of a coupling adapted to take up wear at its bearing-point, so as to avoid rattling and loss of motion, substantially as hereinafter more fully described, and particularly pointed out in the claim.

My improved coupling is made by bending a piece of iron or steel so as to form two arms, A and A', having elbows B and B' at their diverging outer ends, one of which elbows, B, is bent at right angles to form a plate or projection, C.

Through arms B and B' is inserted a threaded bolt, D, having a nut, E, and at the lower corners or bends of arms B and B' are conical projections F and F', which fit into conical recesses in the head G of the sickle-bar. As the head wears, arms A and A' may be brought closer together, so as to take up the wear by tightening the nut E, the plate C being made short enough to permit of the adjustment of arms A A'. The spring of the arms A and A', which, as above stated, are formed by bending or doubling a single piece of metal, operates to keep the conical projections F and F' a proper distance apart within the limit or play allowed between the head of the bolt D and nut E.

Having thus described my invention, I claim and desire to secure by Letters Patent of the United States—

The pitman-coupling for harvesting-machines consisting of the arms A A', having elbows B and B', top plate, C, and cone-shaped projections F and F', in combination with the adjusting-bolt D, having a nut, E, substantially as and for the purpose herein shown and specified.

In testimony that I claim the foregoing as my own I have hereunto affixed my signature in presence of two witnesses.

THOMAS URIE.

Witnesses:
CHAS. M. CAMPBELL,
H. P. WALKER.